INVENTOR.
RICHARD J. RIEKE

*INVENTOR.*
RICHARD J RIEKE
BY
*Ralph D. Hohenfeldt*
ATTORNEY

United States Patent Office 3,452,743
Patented July 1, 1969

3,452,743
BODY IMPEDANCE BRIDGE
Richard J. Rieke, Brookfield, Wis., assignor to General Electric Company, a corporation of New York
Filed Mar. 1, 1965, Ser. No. 436,058
Int. Cl. A61b 5/04
U.S. Cl. 128—2.1                                16 Claims

ABSTRACT OF THE DISCLOSURE

High frequency current is applied to body contacting electrodes and to a current bridge which has adjustable capacitors and resistors for balancing against the static reactive and resistive components of body impedance. The bridge and body electrode currents pass through individual primary windings of a transformer in the secondary of which unbalance currents appear due to dynamic changes in body impedance. The resistive and reactive components are demodulated individually so they may be displayed separately on a meter. Additional body contacting guard and focus electrodes influence the measuring current to selective paths in the body.

---

Figure 1:
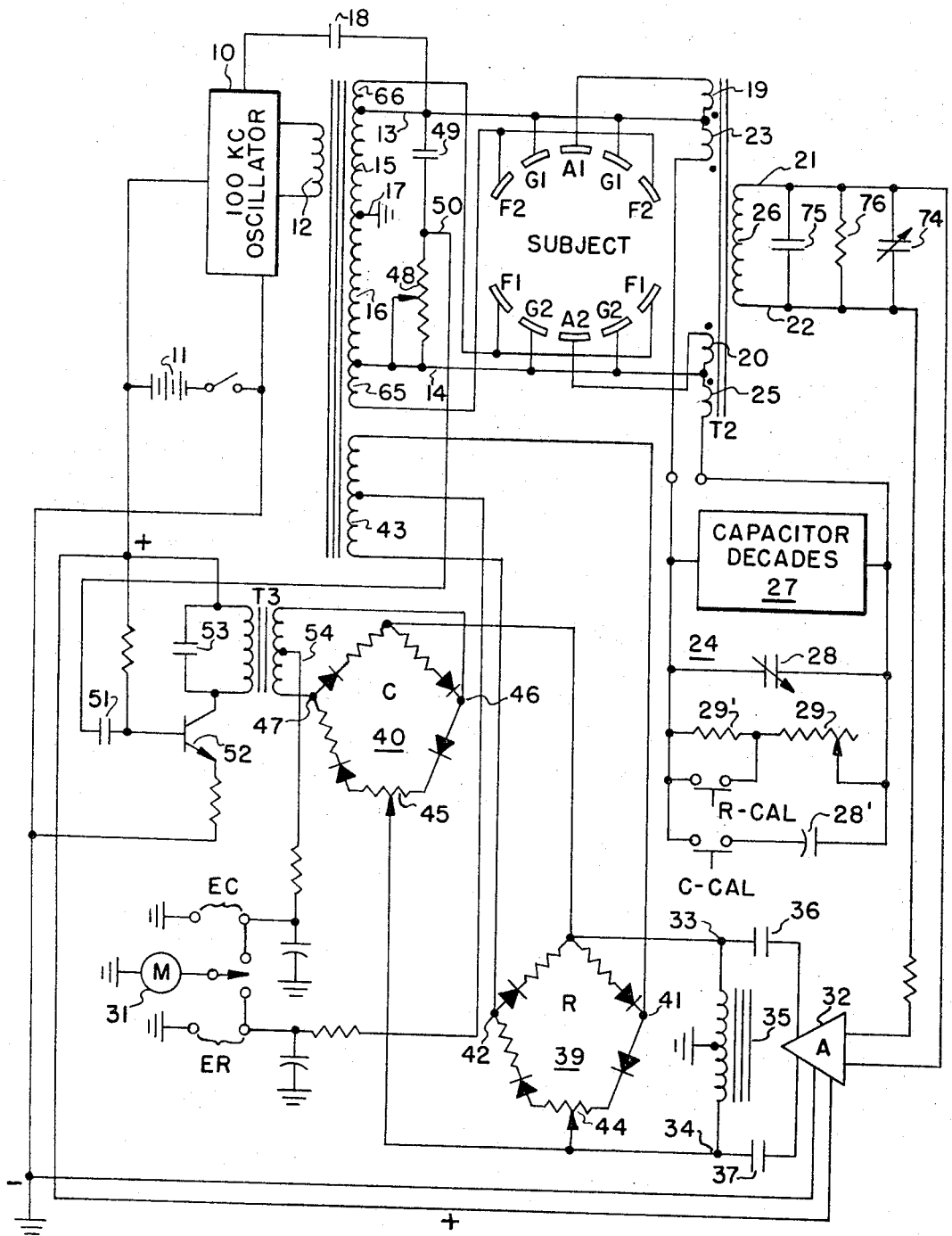

This invention pertains to a device for measuring electrical impedance and is especially useful for correlating body impedance with functional characteristics of the body such as respiratory volume, cardiac blood output, cerebral circulation, pulse detection and others.

That such functional characteristics can be related to body impedance is well known and as a result many schemes have been devised which employ the basic idea of impressing a high frequency voltage on spaced electrodes in contact with the body and measuring the voltage drop across the electrodes or at points between the electrodes. Some of these known devices employ balance bridge circuits to augment sensitivity and some are of highly sophisticated design, but as a general rule, they are adapted to produce a D-C output signal whose value or difference with respect to a reference value is indicative of total body impedance variations.

Among the applications of such instruments is the measurement of impedance changes that may be related to volumetric and stress changes in particular organs of the human body. For example, efforts have been made to correlate blood output of the heart and respiratory volume with impedance changes in the thoracic cavity that result from expansion and contraction of the heart and the lungs, respectively. A major problem associated with trying to make these measurements independently is that the output signal component resulting from one measurement interferes with or conceals the component of the other and this is true to some extent regardless of the care used in positioning the electrodes on the body. Ancillary to this problem is the fact that the current which is admitted to the body takes devious and ill defined paths between electrodes so as to pass through organs that are not of interest as well as through the one that is being studied. This impairs accuracy and makes reproducibility of the measurements difficult between subjects and from time-to-time in the same subject.

Accordingly, a primary object of the present invention is to provide an improved body impedance measuring device that minimizes the above disadvantages and affords some heretofore unavailable features in addition.

A more specific object is to provide a body impedance measuring device that uses a single pair of electrodes for applying the measuring current and for measuring the impedance.

A further object is to provide additional electrode means for influencing flow path of the measuring current to thereby permit better discrimination of the impedance effects of the organ or region of interest as compared with interfering organs.

Another important object is to provide a device that measures and displays numerical values of both static and dynamic body impedance rather than relative values. Static impedance is defined as the non-varying component of impedance and dynamic impedance is that portion of the total impedance that varies cyclically with the physiological function being investigated.

Another object is to provide a device that may be adjusted and put into operation easily and quickly.

Still another object is to provide a device that not only measures total impedance but in addition, yields separate output for the resistive and reactive components of the total impedance. As stated above, these are both separated into their respective static and dynamic components.

Yet another object and feature of the invention that it provides for effecting the cancellation and nullifying of one signal of a specific organ that may tend to interfere with another.

Achievement of the foregoing objects and other specific objects will appear from time to time throughout the specification.

An illustrative embodiment of the invention is generally characterized by applying a high frequency low voltage to a pair of active electrodes that contact the skin of the body with the organ or region of interest between the electrodes. The use of high frequency allows skin capacitance to bypass skin resistance and thereby permits preferential measurement of deep body function. The high frequency is above the lower threshold frequency at which a body organ migh be stimulated by the measuring current. The active electrodes and intervening body form the leg of a current bridge circuit to which the high frequency current is applied. The bridge may be balanced against the resistance, inductance and capacitance of the path through the subject by introducing known values of resistance and capacitance into the other leg thereof. At balance condition, those known values are the equivalent resistance-capacitance or resistance-inductance of the body at bridge frequency. In a preferred embodiment, the various legs of the bridge are in series with primary windings of a single transformer, the secondary of which has a voltage output only during dynamic changes in the body impedance; that is, only when there is an unbalance or an error signal present. The error signal is a high frequency voltage that is composed of resistive and reactive unbalance components. The composite signal is supplied to a pair of demodulators one of which produces an output voltage that represents the dynamic resistance component of body impedance and the other a voltage that represents the dynamic reactance component. These voltages are brought out on individual leads for separate recording or reading on a meter, if desired, or doing both at the same time.

It also will be shown later how the device may be operated to bring about cancellation of the resistive and reactive components of a signal that are not of interest in order to accentuate the signals resulting from the function of a part of the body that is of interest.

The high frequency voltage is also applied, in some cases, to auxiliary guard and focus electrodes on the body. With symmetrical arrangement of electrodes, the guard and focus electrodes do not carry any part of the current that flows between the active electrodes across which the impedance is measured but instead, they are used to control and influence the current path between the active electrodes.

Figure 2:
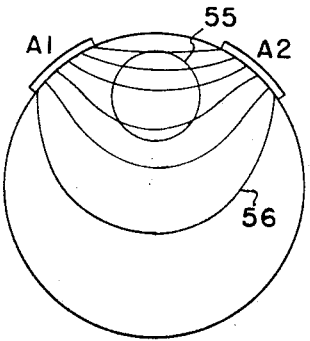
Figure 3:
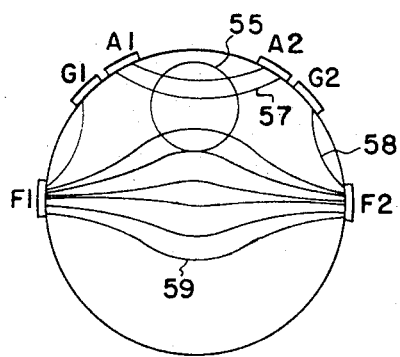
Figure 4:
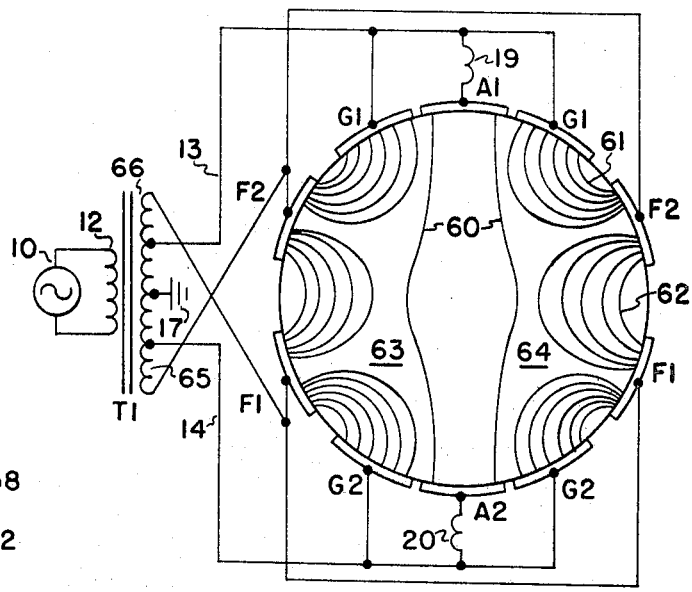
Figure 6:
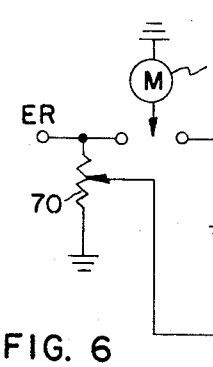
Figure 5:
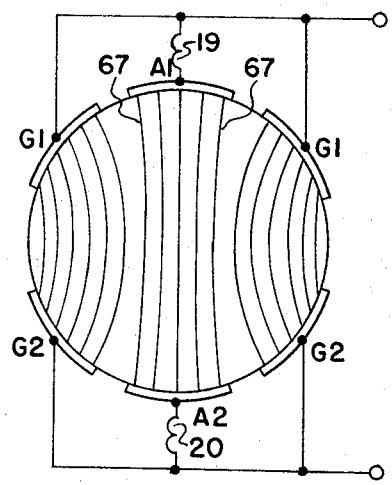
Figure 7:
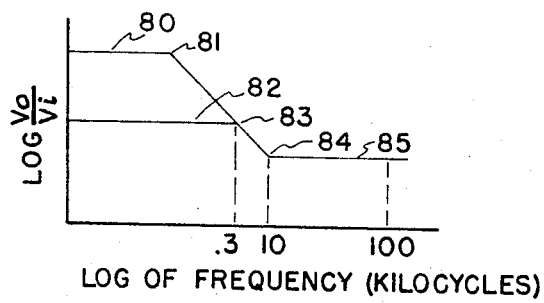

A more detailed description of a preferred embodiment of the invention will now be set forth in reference to the drawing in which:

FIGURE 1 is a schematic diagram of the new impedance measuring device,

FIGURE 2 is a plot of the current paths through a subject when some of the features of the present invention are not utilized during impedance measurement, FIGURES 3, 4, and 5 are plots of current paths subject in two different utilizations of the instant invention, FIGURE 6 is a circuit for cancelling unwanted components of the output signals, and FIGURE 7 is a Bode diagram illustrating voltage versus frequency response.

In FIGURE 1 there is an oscillator 10 supplied from a D-C source 11. The oscillator preferably has a 100 kilocycle A-C ouput that is fed into the primary coil 12 of a transformer T1. The voltage that is used to measure the impedance of the test subject then appears across leads 13 and 14 at opposite ends of secondary windings 15 and 16 of T1. The midpoint 17 between these secondary coils is grounded.

The oscillator 10 is essentially a stable voltage source, that is, it has very low output impedance. This is achieved with feedback by way of capacitor 18 where the signal is rectified and used to control the current in the emitter circuit of a transistor, not shown, and thereby to control the power gain of the oscillator to result in constant voltage output. Thus, the impedance load on the oscillator may range between ten ohms to infinite ohms without changing the voltage on leads 13 and 14 significantly. In this example, the root mean square voltage from either leads 13 and 14 to ground 17 may be taken as 0.57 volt in which case the peak-to-peak voltage between leads 13 and 14 is about 1.6 volts. Of course, other voltages could be used.

The high frequency voltage is fed directly to a current bridge circuit, disregarding the path through guard and focus electrodes G1, G2, F1, and F2 for the moment. One leg of the bridge circuit begins with lead 13 and makes a series circuit consisting of a single turn primary winding 19 of transformer T2, and active electrode A1, part of the subject, active electrode A2, another primary winding 20 and then back to lead 14 and the source.

The bridge leg described is in parallel with a second bridge leg that again begins with lead 13 and includes a primary winding 23 and RC bridge balance circuit 24, another primary winding 25, and then back to lead 14. As the conventional dot notation indicates, equal currents through the subject and the bridge balance circuit induce equal and opposite voltages in the secondary winding 26 of transformer T2 which acts as an adder. Such equal currents flow when the impedance in the parallel paths are equalized, which means that the RC values of the bridge balance circuit 24 are equal to the equivalent RC values appearing in the subject between active electrodes A1 and A2.

It is not necessary that there be a summing primary winding on each side of the subject lead for basic operation. Both windings 19, 20 are included to give an additional degree of freedom. By proper phasing of the two primary windings connected to the subject, a specific physiological function may be accentuated with respect to some other function as will be explained later.

Bridge balance circuit 24 comprises a variable capacitor 28 in parallel with an adjustable resistor 29 and some capacitor decades 27. In the actual device, resistor 29 has a digital readout dial that indicates and corresponds in value with the equivalent resistance of the subject when the bridge is balanced. Resistor 29 may have a value of 0–1000 ohms or be as high as infinity in this example. Capacitor 28 is equipped with a dial for continuous readout in the range of 0–100 micro-microfarads. Capacitor decades 27 may be comprised of several decades such as from 0–1000 micro-microfarads in steps of 100 and 0–10,000 micro-microfarads in steps of 1000. These resistors and capacitors may be adjusted to obtain bridge balance.

In series with variable resistor 29 is a fixed resistor 29' of two-ohm value in this example. Resistor 29' may be short-circuited by a normally open pushbutton switch marked R–CAL to insert a known bridge unbalance and thereby calibrate dynamic resistance signal. In a similar manner, capcacitor 28' and the pushbutton switch marked C–CAL will provide calibration for the dynamic reactance signal.

A desirable characteristic of the preferred embodiment of the invention is that bridge balancing does not require a series of converging adjustments because the bridge is a current bridge that measures the equivalent parallel resistance and capacitance of the body. After the electrodes are placed on the body, balancing is done in two steps (1) adjusting resistor 29 to give a null reading on a micro-ammeter 31 when it is switched to an output terminal ER and, (2) adjusting capacitors 27, 28 to give a null indication on micro-ammeter 31 when it is switched to terminal EC.

After static balance has been established it will be evident that only an impedance change in the test subject will cause an unbalance which produces an error voltage on the secondary of adder transformer T2. The error voltage appearing on leads 21 and 22 of secondary 26 is comprised of resistive and capacitive components that are 90° out-of-phase with each other. These two components of error signal are separately detected in a pair of demodulators to produce separate output voltages of dynamic varitions in resistance of the subject on terminal ER and in reactance terminal EC. The output voltages are preferably smoothed by a filter circuit comprising a resistor in series and a capacitor in parallel adjacent the ER and EC terminals in FIGURE 1.

The high frequency error signal comprised of the resistive and capacitive components is fed to an A-C amplifier 32 which has its output leads 33 and 34 connected to a center grounded reactance 35 through blocking capacitors 36 and 37. Conductors 33 and 34 supply the amplified A-C error signal to a pair of ring demodulators 39 and 40. Ring demodulator 39 is instrumental in rectifying the resistive component of the error signal and demodulator 40 does the same for the capacitive component. These voltages appear with respect to ground on output terminals ER and EC, respectively.

Besides the error signal input to ring demodulator 39 there is a high frequency switching voltage input to one pair of opposite terminals 41 and 42 from a center tapped secondary winding 43 of transformer T1. A line from the center tap is common to output terminal ER which connects to a load such as a pen recorder, not shown, or a meter that measures the voltage from ER to ground. The ground return of the demodulator load is to the center tap of reactor 35.

As is well known, when demodulator input terminal 41 becomes positive with respect to terminal 42, conduction occurs between terminals 41 and 42 in the forward direction through the lower pair of forward biased diodes in the ring demodulator 39. When terminal 41 becomes negative, the top pair of diodes are forward biased. This acts like a switch that on alternate half cycles of the oscillator connects the 100 kilocycles error signal or the phase inverted 100 kilocycle error signal to terminal ER. This, in effect, produces full wave rectification of that portion of the 100 kilocycle error signal that is inphase with the oscillator.

Because there is no phase difference between the resistive 100 kilocycle component of the error signal and the switching voltage from secondary 43, it is this inphase or resistive component of the error signal that is rectified and presented on terminal ER. This signal provides a measurement of the dynamic resistance of the subject and may be calibrated by depressing R–CAL button.

The error signal is also applied across diagonal terminals of capacitive component demodulator 40 the lower terminal of which is the wiper of a potentiometer 45. In this case, however, the phase of the high frequency switching voltage is shifted 90° with respect to the oscillator so as to rectify the capacitive reactance part of the 100 kilocycle composite error signal which part produces a voltage on terminal EC that corresponds with the reactive part of the subject's dynamic impedance.

The 90° phase shifted voltage is derived from a phase shifting circuit including a quardature adjustment potentiometer 48 and a capacitor 49 which are in series and connected across the secondary leads 13 and 14 of transformer T1. The phase shifted voltage appears on the midpoint conductor 50 between potentiometer 48 and capacitor 49. This voltage is applied through a capacitor 51 to the base of a transistor 52 which amplifies it. In the collector circuit of transistor 52 is a transformer T3 which has its primary winding in parallel with a capacitor 53 that together with the winding constitutes a tuned circuit. The phase shifted voltage then appears between opposite ends of the transformer T3 secondary and these ends feed demodulator terminals 46 and 47 as described above.

The center tap 54 of transformer T3 secondary winding is in the path running to output terminal EC on which the voltage representing the dynamic capacitive component of body impedance appears with respect to ground, that is, the center of reactor 35. This signal can be calibrated by depressing the C–CAL pushbutton which inserts a known unbalance into the bridge circuit.

At this juncture, it may be worthwhile to note one of the reasons for using a 100 kilocycle voltage to measure body impedance. The Bode diagram in FIGURE 7 facilitates discussion. In this diagram, the logarithm of the ratio of output voltage and input voltage $Vo/Vi$ of a voltage divider consisting of a fixed resistor in series with the body, is plotted against the logarithm of excitation frequencies. The ratio for dry body electrodes is marked with numerals 80 through 85 and is seen to remain constant only through a low frequency range and then drop at the half-power point 81 and then level off again at higher frequencies. The wet electrode ratio has the numerals 82 through 85 and is seen to remain constant over a larger frequency band but it changes abruptly at the half-power point 83. It is noted that the impedance difference between a dry and wet electrode affected this change. Analysis of this curve results in a first approximation equivalent circuit of the body impedance which consists of skin-electrode impedance of high relative resistance in parallel with capacity. This is in series with the relatively low deep body impedance. If the bridge frequency is high enough, the relatively low skin-electrode capacitive reactance results in a low impedance. Thus, the impedance presented to the bridge is essentially deep body impedance. Hence, the instant device is operated at a frequency of 100 kilocycles which is way beyond the point where there are any frequency effects on output voltage as indicated by the horizontal line 85.

The discussion will now proceed with a description of the circuitry and function of the guard electrodes G1 and G2 and the focus electrodes F1 and F2 which in FIGURE 1 bear on spaced areas of the subject's skin surface along with active electrodes A1 and A2. How these electrodes may be used cooperatively to control the measuring current in select parts of the subject's body will be described shortly hereinafter. We first examine the circuitry in which they are connected.

In the following discussion, it will be observed that elements with the same phase have the same subscript number along with the letter that designates them. Unlike subscripts designate 180° phase relations, but the potential magnitudes may be the same or different as will be indicated. Thus, it is seen that guard electrode G1 has the same phase and essentially the same potential as active electrode A1 because there is practically no impedance in the single turn primary winding 19 that is in series with A1 because they are both connected to high frequency lead 13. The same may be said about active electrode A2 and guard electrode G2 which are both connected to line 14. In the symmetrical electrode placement shown, the current will flow from A1 to A2 and from G1 to G2. There will be no current flow from the A to G electrodes. Note, however, that the measuring current passes through the subject only between active electrodes A1 and A2 since it is only these that are in the bridge circuit leg.

Also provided are pairs of focusing electrodes F1 and F2 which are so placed as to be 180° out-of-phase with the adjacent A and G electrodes. Thus, there is a 180° phase difference and a potential difference between G1 and F2 and a phase difference but not an absolute potential difference between F1 and F2. Observe that the focusing electrodes are supplied with a higher voltage than the active electrodes because the former are connected to remotely opposite ends of additional secondary windings 65 and 66 of transformer T1. Windings 65 and 66 may be tapped for different voltage steps but these connections are omitted in the illustration. In general, it may be said that the voltage on the focus electrodes should be selectable to have a fixed ratio with respect to the active electrodes.

Refer now to FIGURE 2 which simulates a human chest, for example, to which only active electrodes A1 and A2 are applied. Assume that impedance changes due to cardiac function are desired to be measured and that the heart is represented by circular object 55 that is surrounded by other body tissue with different impedance and which tissue is simulated in the phantom on which the tests are made. The plot of the current paths are represented by curved lines 56 extending between electrodes, but the equipotential field lines are omitted. Nevertheless, it may be seen that the current flow path is devious and non-uniform. As a consequence, the current passes through regions of the chest the impedance changes of which one does not desire to ascertain and as a result, dynamic changes in heart impedance could have superimposed changes that are due to respiratory function. This would reduce accuracy and intelligibility of the output signals.

FIGURE 3 indicates how the current flow lines 57 between active electrodes A1 and A2 may be urged toward the top of the simulated body by use of a set of guard and focus electrodes G and F with the former. This is analogous to urging the measuring current from the posterior region of the chest to the anterior region whereupon most if not all of it passes through the heart region 55. As can be observed, this is done by applying higher voltage on F1 with respect to G1, and on F2 with respect to G2. There is current flow 58 between the guard G and focus F electrodes but this is not measured. In addition, there is flow between F1 and F2 and this is not measured either, but it does produce an electric field which properly influences the measurement current 57 to pass through the region of the phantom heart. The equipotential lines of this plot are again omitted to simplify the presentation.

Another of the many electrode configurations is illustrated in FIGURE 4. In this case, two pairs of focus electrodes F1 and F2 and two pairs of guard electrodes G1 and G2 are employed along with the pair of active electrodes A1 and A2. The electrode arrangement is similar to that depicted in FIGURE 1 as are the voltages and phase relationships. The high frequency transformer T1 leads and the bridge circuit coils 19 and 20 are shown in FIGURE 4 to eliminate the need for referring back to the schematic diagram.

FIGURE 4 has several interesting aspects among which is the fact that the preferred measurement current path is limited to a central channel 60 between active electrodes A1 and A2. A self-evident advantage of this arrangement is that it facilitates making deep body impedance measurements with minimum interference from organ lying outside the path 60. In this case, current 61 flows in symmetrical patterns between for example, the guard electrodes G1 and focus electrodes G2 because they are out-of-phase and at different potentials. Current lines 62 flow between focus electrodes F1 and F2 because they are different potentials. The measuring current flows between active electrodes A1 and A2.

In FIGURE 4, impedance disturbances occurring outside the measuring path 60 are minimized by reason of field free regions 63 and 64 being created by the current flow configuration between other than the active electrodes. Respiratory impedance changes for example, would then have a lesser effect on a current path directed through the heart region. It has also been demonstrated that by reversing the polarities on F1 and F2, the current flow path configuration 60 may be changed to have an hour-glass shape instead of the central bulge which it exhibits in FIGURE 4. This is advantageous in making impedance measurements that are confined to some small, deep region on the body.

Another application using only active electrodes A and guard electrodes G is shown in FIGURE 5. This is especially useful for measuring electrical resistivity of the material between the active electrodes. Here the guard electrodes control the geometry of the current path between the active electrodes to a column of known dimensions so as to enable computation of resistance or capacitance per cubic centimeter, for example.

The number of possible electrode configurations is, of course, much larger than the few that have been illustrated and the one chosen will depend on the experiences of the the clinician and the body function under study. When the active electrodes A1, A2 are used alone, the current path betwen them will diverge in such a manner that the impedance of the path will be minimum. This is ordinarily tolerable only when interference effects are of little consequence. When guard electrodes G1, G2 surround the active electrodes, the guard electrodes supply the diverging current, thus leaving the current between active electrodes essentially parallel. The focus electrodes F1, F2 surround the guard electrodes which isolate the focus electrodes from the active electrodes. The focus electrodes can cause the active current path to converge or diverge in its central region to a controllable degree depending on relative excitation, phase and magnitude of the applied voltages and the size and placement of the electrodes. It is also contemplated to use an additional body electrode, not shown, when making some measurements. This electrode may be connected to grounded midpoint 17 on the transformer T1 for purposes which will not be explained because they relate to a special application of the device and not primarily to its construction.

With no guard or focus electrodes present, the respiratory signal might be ten times as great as the cardiac signal. With guard and focus electrodes the respiratory signal is greatly reduced but there may still be some present that will constitute background on the dynamic heart signal if that is the signal of interest. To eliminate more of the respiratory signal or vice versa, one may take advantage of the ability of the invention to give independent output voltages which are proportionate to the dynamic variations in resistive and capacitive impedance in the body.

By placing the resistive output voltage ER out-of-phase with the capacitive voltage EC and adjusting the magnitude of these two components so that the amount of respiratory signal is the same, significant annihilation of the respiratory signals can be obtained by bucking them together. Since it happens that the amounts of cardiac signal superimposed on the resistive and capacitive components are not the same, bucking of the respiratory signal ER—EC, yields a residual cardiac signal which is several times larger than the amount of residual respiratory signal.

By way of example, let us assume that signals ER and EC that are caused by respiration are essential sinusoidal and varying about a balance level during recording. Assume further that respiration signal strength predominates but has superimsoper on it a small background signal due to impedance changes caused by heart action and that heart impedance is of interest.

To subtract out the respiration signal, the bridge is balanced as previously described. The micro-ammeter 31 should then deflect slightly equal and opposite directions when switched from ER to EC to indicate balance and opposite polarities for subtraction. If the polarities are not opposite, the phase relationship of the switching voltage applied to modulator 39 may be changed by exchanging the leads going to its terminals 41 and 42, or alternatively, the leads 46 and 47 on modulator 40 may be exchanged. A double-pole double-throw switch, not shown, may be inserted in the circuit to facilitate this procedure.

After this is accomplished, the remainder of the procedure may be understood in reference to FIGURE 6 which shows potentiometer 70 and 71 connected respectively to EC and ER. These potentiometers are to adjust the absolute magnitude of the respiration resistance and capacitance signal to be equal to as to yield a residual signal which appears on terminal E and constitutes the difference of the residual resistive and capacitive voltage components due to heart impedance changes. Subtraction takes place in the circuit composed of resitsors 72 and 73. The residual heart signal may be amplified and displayed on a recorder or meter, or both.

Another technique that is useful and available for discriminating between signals by subtraction employs the 100 kilocycle portion of the bridge. This involves reversing the polarity of one of the primary windings such as 19 which is connected to an active electrode A. The guard electrodes G1 and G2 would be located unsymmetrically so that current flows, for example, from A1 to the G2 pair and from A2 to the G1 pair. The currents from A1 and A2 would not be the same. The path from A1 may include the desired body organ and function such as the heart and the path from A2 may exclude most of the heart signal but include much of the interfering respiratory signal. Thus, the combination of active, guard and focus electrodes are so placed as to give nearly equal sensitivity to the undesired function and to maximize the non-equality of the active electrodes to the desired function. The 100 kilocycle current subtraction made in the bridge transformer T2 would give preferred sensitivity to the desired function.

Which of the two above described techniques would be used would depend on the specific application. In some cases, combined usage may be advantageous.

If required, alignment of the device is simply a matter of determining that phase relations are correct. This is a two-step procedure which is carried out with a dummy RC load between the A1 and A2 electrodes. First, microammeter 31 is switched to the ER terminal and the C-CAL button is pressed. This inserts a capacitive change while the resistive component is being read. If the meter does not deflect, capacitor quadrature is properly set. If deflection occurs, trimmer capacitor 74 is adjusted until deflection does not occur. Trimmer capacitor 74 along with a fixed capacitor 75 and a fixed resistor 76 are loads on the adder transformer T2 secondary and act to eliminate phase shift between the primary and secondary of that transformer in a known manner. Next and secondly, the meter 31 is switched to EC terminal and the R-CAL button is pressed. If the meter deflects, the resistance quadrature potentiometer 48, on the secondary of T1, is adjusted until deflection disappears.

When using the new impedance measuring device, the active electrodes A1 and A2 may be attached to the subject with an elastic band or some other means as may be guard and focus electrodes G and F. The device is then energized. Next the bridge is balanced as evidenced by the meter 31 not departing from null when switched to ER and EC terminals. Resistance balance is effected by adjusting potentiometer 29 and capacitive balance by adjusting capacitor 28 and the decades 27 in the balance circuit 24. The equivalent static resistance of the body may be read from the digital display of potentiometer 29 and the capacitance from capacitor 27 and 28. For a human adult chest, with electrodes placed in the armpit regions, the deep body impedance values may be in the ranges of about 120 to 160 ohms and 2,000 to 3,500 micro-microfarads. During respiration, dynamic changes may be around 3 ohms and 175 micro-microfarads. With the electrodes on other parts of the body, the static and dynamic values will be different, of course.

In most cases, there is good linearity between both dynamic changes in ER and EC and the body function of interest. As is now clear, either of these dynamic changes on both may be recorded in accordance with the clinician's desires. In any case, the absolute values of either voltage is readily ascertainable from the chart recorder. This is done by pressing either or both the R–CAL and C–CAL buttons to introduce a known resistance unbalance of about 2 ohms by way of resistor 29' or about 200 micro-microfarads by way of capacitor 28'. This causes a pip to appear on the recorded waveforms for the dynamic resistance and capacitive changes. The height of the pips constitute a scale of the corresponding known values of RC which can be used to measure those values on the chart.

The device has been described as primarily for measuring impedance that is comprised of resistive and capacitive reactance components as is most common in the human body, but it should be appreciated that the device may be used with minor modification to measure loads having inductive reactance also. Those skilled in the art will understand that one way to do this is to separate capacitances 27, 28, 28' from the existing balancing circuit 24 with the resistors 29 and 29' connected as they are to primary windings 23 and 25 of transformer T2. The capacitors may then be reconnected in a parallel group that is connected in series with another pair of primary windings, not shown, on T2. The other pair of windings must be connected to induce flux in the transformer T2 that is oppositely phased so that the capacitors appear inductive to the transformer. If the additional primary windings are available the above discussed circuit changes may be made with a suitable switch, not shown, when inductive loads are to be measured.

In the described embodiment of the invention, it was convenient to have output in terms of resistive and reactive components of the subject's load impedance. It should be understood, however, that the output could be in terms of any two parameters such as impedance, phase angle, resistance, and reactance since they have a fixed relation to each other. Also the bridge can be set up to measure the equivalent series impedance components as well as the parallel components, but when balancing the series bridge a number of converging adjustments may be necessary because of interaction between resistive and reactive current components.

In summary, a new body impedance device has been described which enables a greater degree of selectivity of the impedance path of interest and minimizes extraneous effects by using focus and guard electrodes along with active measuring electrodes. The device permits reading the actual static values of both the resistive and reactive components of impedance and it permits reading and recording the dynamic changes in the resistive and reactive components separately and jointly. It is easy to balance without need for converging adjustments technique and it is easy to calibrate by merely pressing calibration switch buttons.

Although, a preferred embodiment of the invention has been described in considerable detail, it should be understood that such description is illustrative rather than limiting, for those skilled in the art will be able to make modifications readily and to apply the invention to its various intended uses. Therefore, the true scope of the invention is to be determined only by construing the claims which follow.

It is claimed:

1. A device for measuring the impedance in a region of a subject comprising:
   (a) a high frequency source,
   (b) a pair of measuring electrodes adapted to be placed on the subject apart from each other,
   (c) a first transformer primary winding that is in a series circuit with the electrodes and the subject region to form a leg of a current bridge across the source,
   (d) adjustable resistor and capacitor means,
   (e) a second transformer primary winding that is in predetermined phase relationship with the first and in circuit with the resistor and capacitor means to form another leg of said bridge across the source,
   (f) the said resistor and capacitor means being adjustable to balance the bridge against the equivalent resistive and reactive components of the subject impedance across the measuring electrodes, and
   (g) a secondary transformer winding that is magnetically coupled with the primary windings for detecting an error signal voltage induced by the primary windings in the secondary windings and hence the balance condition of the said primary windings.

2. The invention set forth in claim 1 including:
   (a) a demodulator means that is adapted to admit and compare the composite high frequency error signal voltage with a high frequency voltage that is in phase with the source voltage and hence the resistive component of error signal voltage to yield an output voltage that corresponds with the resistive component of body impedance variations that unbalance the bridge.

3. The invention set forth in claim 1 including:
   (a) a demodulator means that is adapted to admit and compare the composite high frequency error signal voltage with a high frequency voltage that is 90° out-of-phase with the same voltage and hence is inphase with the capacitive component of error signal current to yield an output voltage that corresponds with the capacitive component of body impedance variations that unbalance the bridge.

4. The invention set forth in claim 2 including:
   (a) a calibrating resistor of predetermined value connected in the said other bridge leg, and
   (b) a switch for switching the calibrating resistor in and out of the bridge leg to produce a predetermined error signal for calibrating the output signal voltage resistive component that is due to the resistance of the subject.

5. The invention set forth in claim 3 including:
   (a) a calibrating capacitor of predetermined value connected in the said other bridge leg, and
   (b) a switch for switching the calibrating capacitor in and out of the bridge leg to produce a predetermined error signal for calibrating the output signal voltage reactive component that is due to reactance of the subject.

6. The invention set forth in claim 1 including:
   (a) demodulator means connected to receive the error signal composed of two different resistive components and two different reactive components due to two different physiological function changes that cause superimposed impedance variations in the subject,
   (b) the said demodulator means being adapted to produce separate output voltages that correspond with the separate total resistive and reactive variations in the body and hence with the separate total resistive and reactive voltage component variations in the error signal,
   (c) means for controlling a demodulator to cause its output voltage to be 180° out-of-phase with the other,
   (d) means including a meter for comparing and permitting equaliaztion of the total resistive and reactive output voltages, and (e) means for producing an attenuated voltage derived from one output voltage which is summed with a voltage derived from the other output voltage to effect cancellation of the resistive and reactive voltage components due to one body function and to let remain residual resistive minus the reactive components of voltage that are representative of impedance changes due to the other body function.

7. The invention set forth in claim 1 including:
(a) guard electrode means that are adapted to contact the subject and are connected across the source with the subject intervening to form a circuit that is in parallel with the path through the subject between measuring electrodes,
(b) whereby to establish a current flow path between guard electrodes the influences the shape of the current path between measuring electrodes.

8. The invention set forth in claim 1 wherein:
(a) the source comprises the secondary winding of a transformer having intermediate voltage points that are connected to the measuring electrodes and higher voltage points, and
(b) focus electrode means that are connected across the higher voltage points of the secondary winding with the subject,
(c) the ratio of the resistance signal to the to form a circuit through the subject that is in parallel with the path through the subject between measuring electrodes.

9. The invention set forth in claim 1 including:
(a) a pair of detector means supplied with the error signal,
(b) the detector means being adapted to produce output signals corresponding respectively with the resistive and reactive variations in the impedance of the subject, the ratio of the resistance signal to the reactance signal of one function of the subject that is desired to be measured being different from the same ratio of an undesired function,
(d) means for adjusting the magnitude and polarity of the undesired resistive and reactive signals to such values that they will cancel each other when summed, and
(e) a summing circuit for receiving said signals and having an output terminal on which appears a residual signal corresponding with impedance variations due to the function it is desired to measure.

10. A device for measuring the impedance in a region of a subject comprising:
(a) a high frequency source,
(b) a pair of measuring electrodes adapted to be placed on the subject apart from each other,
(c) a current bridge having a leg thereof connected in series with said measuring electrodes and said series circuit being connected across the high frequency source,
(d) at least one pair of guard electrodes adapted to be placed on the subject apart from each other and said guard electrodes being connected directly to said high frequency source to create a current path through the subject that is in parallel with the path between the measuring electrodes and that influences the shape of the current path between the measuring electrode,
(e) a balancing circuit including parallel connected selectable resistive and reactive components connected in series with the high frequency source and constituting another leg of the said current bridge which is connected in parallel with the aforementioned leg,
(f) said balancing circuit components being adjustable to balance the current flowing under static conditions through the subject and to produce an unbalanced current in the bridge which current corresponds with changes in the dynamic impedance of the subject, and
(g) means coupled to the current bridge for sensing the unbalanced current and displaying the same as a function of dynamic impedance changes in the subject.

11. A device for measuring the impedance in a region of a subject comprising:
(a) a high frequency source having plural output terminals at different potentials,
(b) a pair of measuring electrodes adapted to be placed on the subject apart from each other and connected across one pair of source terminals,
(c) means in circuit with the measuring electrodes for measuring the impedance across them and the subject,
(d) pairs of focus electrode means adapted to be placed on the subject apart from each other and connected to another pair of terminals at different potentials from the measuring electrodes,
(e) pairs of guard electrode means adapted to be placed on the subject apart from each other and connected to the source at substantially the same potential as the measuring electrodes,
(f) whereby a current path is established in the subject between the guard and focus electrode means which path influences the shape of the current path between measuring electrodes but does not conduct any of the current between the measuring electrodes.

12. A device for measuring theimpedance of a subject comprising:
(a) a high frequency source,
(b) a pair of measuring electrodes adapted to be placed on the subject spaced apart from each other,
(c) a first transformer primary winding that is in series circuit with the measuring electrodes and the subject to from a leg of a current bridge across the source,
(d) the said subject exhibiting resistive and reactive components of impedance, and
(e) at least another transformer primary winding having at least an adjustable capacitor in series with it and connected across the source as a series circuit and another leg of the current bridge,
(f) the current direction through the first primary winding being such as to have the reactive component of current flowing through it to induce a voltage and hence a flux of one polarity in the winding,
(g) the current direction through the other winding being selectable by interchanging the ends of the other winding so that the capacitive component of current therethrough may induce a voltage in that winding that has a polarity opposite to the inductive reactive component of flux caused by the other winding to thereby permit balancing of the inductive components of subject impedance,
(h) the absolute value of the reactance of the said capacitor under balanced condition being equal to the inductive reactance component of subject impedance.

13. The invention set forth in claim 12 including:
(a) a secondary transformer winding that is magnetically coupled with the primary windings and adapted to produce an error voltage that is dependent on deviations from balanced conditions in the primary windings.

14. A device for measuring the impedance of a subject comprising:
(a) a pair of measuring electrodes adapted to be placed on the subject spaced apart from each other,
(b) a first transformer primary winding that is in series with the measuring electrodes and the subject to form a leg of a current bridge across the source,
(c) the said subject presenting resistive and reactive components of impedance between measuring electrodes,
(d) another transformer winding having an adjustable resistor in series with it and connected across the source as a series circuit, and another leg of a bridge, (e) a winding that is magnetically coupled with the primary windings and adapted to produce substantially no voltage when the resistive component of current in the other bridge leg is balanced against the equivalent resistance in the leg that includes the subject, and (f) a detector circuit supplied from the secondary winding for producing a signal that varies with resistance changes in the subject.

15. The invention set forth in claim 14 including means for controlling the current flow path between measuring electrodes, the said means comprising:

(a) at least one pair of guard electrode means adapted to contact with the body to form a parallel current path with that of the measuring electrode path, (b) the said guard electrode means being connected to the source independently of the bridge legs.

16. The invention set forth in claim 15 including additional means for controlling the current flow paths, said means comprising:

(a) at least one pair of focus electrode means adapted to contact with the body to form a current path between them and the guard electrodes, (b) the said focus electrodes being connected to the source independently of the bridge legs.

References Cited

UNITED STATES PATENTS

| | | | |
|---|---|---|---|
| 2,111,135 | 3/1938 | Bagno | 128—2.1 |
| 2,184,511 | 12/1939 | Bagno et al. | 324—56 |
| 2,661,734 | 12/1953 | Holzer et al. | 128—2.1 |
| 3,131,689 | 5/1964 | Rodler | 128—2.1 |
| 3,149,627 | 9/1964 | Bagno | 128—2.1 |
| 3,316,896 | 5/1967 | Thomasset | 128—2.1 |

WILLIAM E. KAMM, *Primary Examiner.*

U.S. Cl. X.R.

324—57